United States Patent
Stuyck et al.

(10) Patent No.: US 10,909,744 B1
(45) Date of Patent: Feb. 2, 2021

(54) SIMULATING GARMENT WITH WRINKLES BASED ON PHYSICS BASED CLOTH SIMULATOR AND MACHINE LEARNING MODEL

(71) Applicant: Facebook Technologies, LLC, Menlo Park, CA (US)

(72) Inventors: Tuur Jan M Stuyck, San Francisco, CA (US); Tony Tung, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/408,869

(22) Filed: May 10, 2019

(51) Int. Cl.
*G06T 15/04* (2011.01)
*G06N 20/00* (2019.01)
*G06F 30/20* (2020.01)

(52) U.S. Cl.
CPC .............. *G06T 15/04* (2013.01); *G06F 30/20* (2020.01); *G06N 20/00* (2019.01); *G06T 2210/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0273457 | A1* | 11/2011 | De Aguiar | G06T 17/00 345/474 |
| 2013/0046522 | A1* | 2/2013 | Kavan | G06T 13/20 703/6 |
| 2015/0242546 | A1* | 8/2015 | Jeon | G06F 30/20 703/2 |
| 2019/0043269 | A1* | 2/2019 | Lin | G06T 7/75 |
| 2019/0102337 | A1* | 4/2019 | Brabec | G06K 9/6282 |
| 2019/0244407 | A1* | 8/2019 | Wiesel | G06Q 30/0625 |

* cited by examiner

*Primary Examiner* — Wesner Sajous
(74) *Attorney, Agent, or Firm* — Foley & Lardner LLP

(57) ABSTRACT

Disclosed herein includes a system, a method, and a non-transitory computer readable medium for generating and rendering computer generated images of simulated garments with wrinkles based on a physics based cloth simulator and a machine learning model. In one aspect, by a physics based cloth simulator executing on one or more processors, a first normal map of a simulated garment having a first level of detail of wrinkles and a second normal map of the simulated garment having a second level of detail of wrinkles higher than the first level of detail of wrinkles are generated. In one aspect, by the one or more processors, the first normal map and the second normal map are provided as inputs to train a machine learning model. In one aspect, by the one or more processors via training, the machine learning model is configured to generate an output normal map with a level of detail of wrinkles higher than that of an input normal map.

20 Claims, 15 Drawing Sheets

Garment Simulator
100

Physics Based Cloth Simulator
130

Machine Learning Model
150

500

```
┌─────────────────────────────────────────────┐
│  Generate a first normal map of a simulated garment  │
│                       510                            │
└─────────────────────────────────────────────┘
                        │
                        ▼
┌─────────────────────────────────────────────┐
│  Generate a second normal map of a simulated garment │
│                       520                            │
└─────────────────────────────────────────────┘
                        │
                        ▼
┌─────────────────────────────────────────────┐
│  Provide the first normal map and the second normal map as inputs to a │
│                machine learning model                │
│                       530                            │
└─────────────────────────────────────────────┘
                        │
                        ▼
┌─────────────────────────────────────────────┐
│        Configure the machine learning model         │
│                       540                            │
└─────────────────────────────────────────────┘
```

Generate a first normal map of a simulated garment
1010

Apply the first normal map as an input to a machine learning model to generate a second normal map
1020

Render, using the second normal map, an image of the simulated garment
1030

FIG. 10

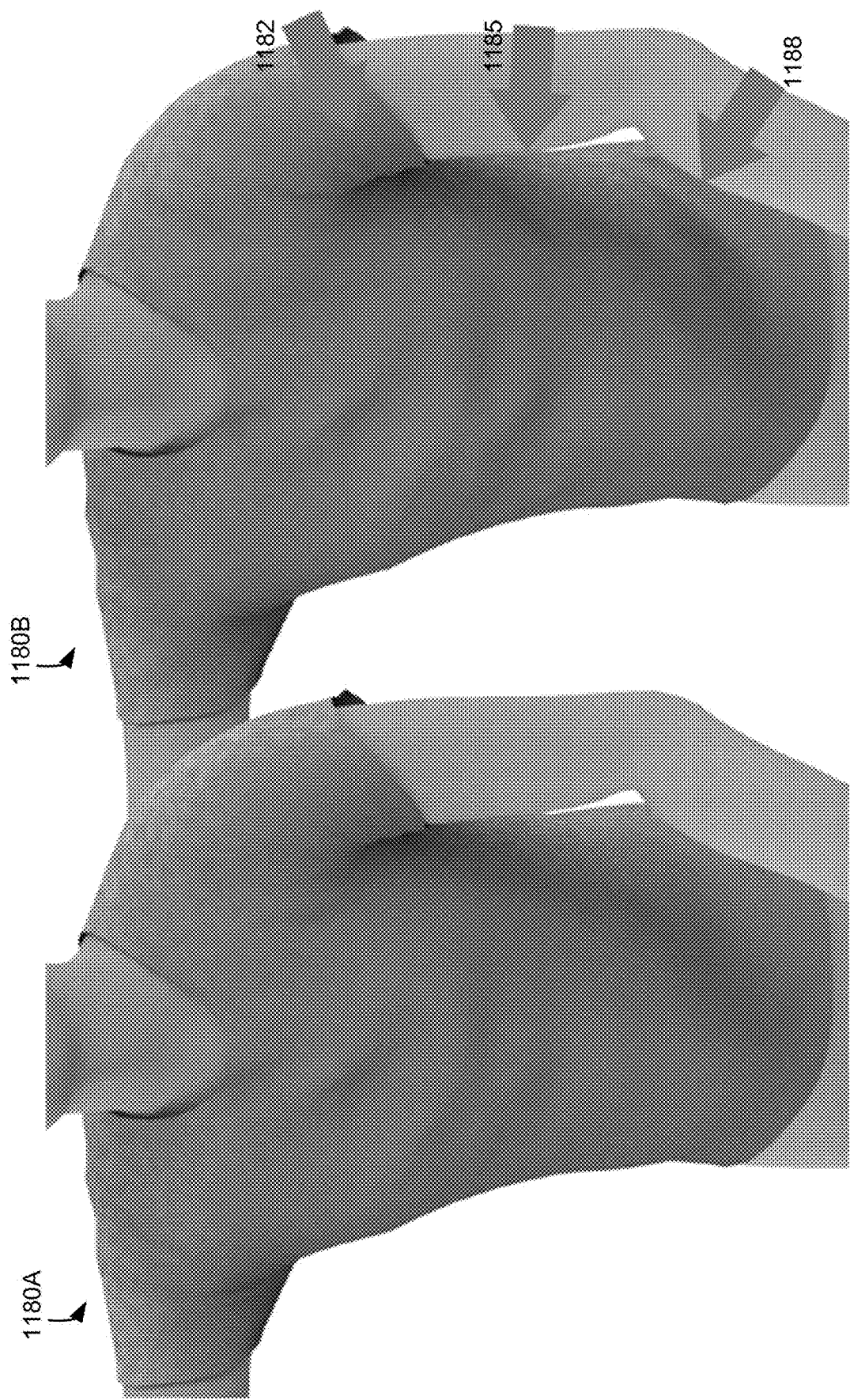

SIMULATING GARMENT WITH WRINKLES BASED ON PHYSICS BASED CLOTH SIMULATOR AND MACHINE LEARNING MODEL

FIELD OF DISCLOSURE

The present disclosure is generally related to image processing, including but not limited to rendering images of simulated garments with wrinkles.

BACKGROUND

Computer-generated graphics have become prevalent in artificial reality experiences (e.g., augmented reality (AR), virtual reality (VR), or mixed reality (MR)), animation, movies, video games, virtual dressing rooms, educational content, etc. One aspect of rendering computer-generated graphics includes simulating an appearance of a garment and rendering an image of the simulated garment, as if the garment is in a real world.

SUMMARY

Various embodiments disclosed herein are related to a method for simulating a garment. In some embodiments, the method includes generating, by a physics based cloth simulator executing on one or more processors, a first normal map of a simulated garment having a first level of detail of wrinkles and a second normal map of the simulated garment having a second level of detail of wrinkles higher than the first level of detail of wrinkles. In some embodiments, the method includes providing, by the one or more processors, the first normal map and the second normal map as inputs to train a machine learning model. In some embodiments, the method includes configuring, by the one or more processors via training, the machine learning model to generate an output normal map with a level of detail of wrinkles higher than that of an input normal map.

In some embodiments, the method includes receiving, by the physics based cloth simulator, a first garment template of a garment having a first resolution, and a second garment template of the garment having a second resolution higher than the first resolution. In some embodiments, the method includes deforming, by the physics based cloth simulator, the first garment template according to simulated force applied to the first garment template, to generate the first normal map. In some embodiments, the method includes deforming, by the physics based cloth simulator, the second garment template according to the simulated force applied to the second garment template, to generate the second normal map. In some embodiments, the method includes receiving, by the one or more processors, scanned data of the garment having a resolution equal to or higher than the second resolution. In some embodiments, the method includes generating, by the one or more processors, the second normal map by applying the scanned data of the garment to the second garment template.

In some embodiments, the method includes generating, by the physics based cloth simulator, for a body pose corresponding to an instance of motion. The simulated garment may have the first level of detail of wrinkles and the simulated garment may have the second level of detail of wrinkles. In some embodiments, the method includes generating, by the physics based cloth simulator for input to the machine learning model, the first normal map and the second normal map by normalizing the simulated garment having the first level of detail of wrinkles and the simulated garment having the second level of detail of wrinkles, based on a reference body pose different from the body pose corresponding to the instance of motion. In some embodiments, the first normal map and the second normal map have a common UV space.

In some embodiments, the method includes generating, by the physics based cloth simulator, a third normal map of the simulated garment having the first level of detail of wrinkles. In some embodiments, the method includes applying, by the one or more processors, the third normal map as an input to the machine learning model to generate a fourth normal map having the second level of detail of wrinkles higher than the first level of detail of wrinkles. In some embodiments, the method includes rendering, by the one or more processors using the fourth normal map, an image of the simulated garment having the second level of detail of wrinkles.

Various embodiments disclosed herein are related to a method for simulating a garment. In some embodiments, the method includes generating, by a physics based cloth simulator executing on one or more processors, a first normal map of a simulated garment having a first level of detail of wrinkles. In some embodiments, the method includes applying, by the one or more processors, the first normal map as an input to a machine learning model to generate a second normal map having a second level of detail of wrinkles higher than the first level of detail of wrinkles. In some embodiments, the method includes rendering, by the one or more processors using the second normal map, an image of the simulated garment having the second level of detail of wrinkles. In some embodiments, the machine learning model is trained by providing i) a third normal map of the simulated garment having the first level of detail of wrinkles generated by the physics based cloth simulator and ii) a fourth normal map of the simulated garment having the second level of detail of wrinkles generated by the physics based cloth simulator, as inputs to the machine learning model.

In some embodiments, the method includes receiving, by the physics based cloth simulator, a garment template of a garment, and deforming, by the physics based cloth simulator, the garment template according to simulated force applied to the garment template, to generate the first normal map. In some embodiments, the method includes dividing the deformed garment template into a plurality of segments to generate the first normal map. In some embodiments, the method includes applying, by the one or more processors, each corresponding segment of the plurality of segments as an input to the machine learning model to generate a corresponding plurality of output segments having a level of detail of wrinkles higher than that of the corresponding segment. In some embodiments, the method includes combining, by the one or more processors, the corresponding plurality of output segments to render the image of the simulated garment.

Various embodiments disclosed herein are related to a system for simulating a garment. In some embodiments, the system includes one or more processors configured to generate, via a physics based cloth simulator executing on the one or more processors, a first normal map of a simulated garment having a first level of detail of wrinkles. In some embodiments, the one or more processors are configured to apply the first normal map as an input to a machine learning model to generate a second normal map having a second level of detail of wrinkles higher than the first level of detail of wrinkles. In some embodiments, the one or more processors are configured to render, using the second normal map, an image of the simulated garment having the second level of detail of wrinkles.

In some embodiments, the one or more processors are further configured to receive, via the physics based cloth simulator, a garment template of a garment, and deform, via the physics based cloth simulator, the garment template according to simulated force applied to the garment template, to generate the first normal map. In some embodiments, the one or more processors are configured to divide the deformed garment template into a plurality of segments to generate the first normal map. In some embodiments, the one or more processors are further configured to apply each corresponding segment of the plurality of segments as an input to the machine learning model to generate a corresponding plurality of output segments having a level of detail of wrinkles higher than that of the corresponding segment. In some embodiments, the one or more processors are further configured to combine the corresponding plurality of output segments to render the image of the simulated garment. In some embodiments, the machine learning model is trained by providing i) a third normal map of the simulated garment having the first level of detail of wrinkles generated by the physics based cloth simulator and ii) a fourth normal map of the simulated garment having the second level of detail of wrinkles generated by the physics based cloth simulator, as inputs to the machine learning model.

In some embodiments, the machine learning model is trained by receiving, by the physics based cloth simulator, a first garment template of a garment having a first resolution, and a second garment template of the garment having a second resolution higher than the first resolution. In some embodiments, the machine learning model is trained by deforming, by the physics based cloth simulator, the first garment template according to simulated force applied to the first garment template to generate the third normal map. In some embodiments, the machine learning model is trained by deforming, by the physics based cloth simulator, the second garment template according to the simulated force applied to the second garment template to generate the fourth normal map. In some embodiments, the machine learning model is trained by receiving, by the one or more processors, scanned data of the garment having a resolution equal to or higher than the second resolution, and generating, by the one or more processors, the fourth normal map by applying the scanned data of the garment to the second garment template.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 5 is a flow chart illustrating a process of training a machine learning model of a garment simulator, according to an example implementation of the present disclosure.

FIG. 10 is a flow chart illustrating a method of rendering a simulated garment by a garment simulator, according to an example implementation of the present disclosure.

FIGS. 11B and 11C show effects of augmenting wrinkle details by incorporating scanned data, according to an example implementation of the present disclosure.

DETAILED DESCRIPTION

Figure 1:
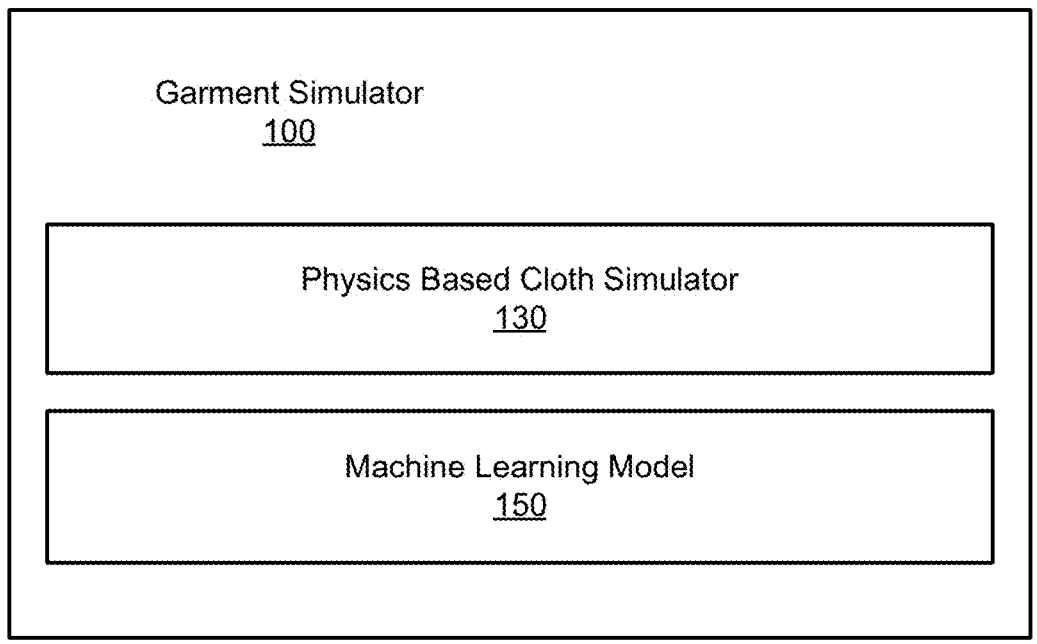
FIG. 1 is a block diagram of a garment simulator for simulating a garment by employing a physics based cloth simulator and a machine learning model, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein include embodiments of a system, a method, and a non-transitory computer readable medium for generating and rendering computer generated images of simulated garments with wrinkle details based on a physics based cloth simulator and a machine learning model. A garment may include a piece of clothing or a piece of fabric. A simulated garment may be a virtual garment or any computer generated model of a garment. Wrinkles on a garment may include any type or form of deformation, folding or bending of the garment. In one aspect, the physics based cloth simulator simulates wrinkles or other deformations of garments according to simulated force, and the machine learning model enhances a resolution and detail of wrinkles in the physics based cloth simulation. In some embodiments, the disclosed system, method, and non-transitory computer readable medium are implemented to render artificial reality experiences (e.g., augmented reality (AR), virtual reality (VR), or mixed reality (MR)), animation, movies, video games, virtual dressing rooms, educational content, etc.

In one approach, obtaining simulated garments disclosed herein involves two phases: a training phase and a runtime phase. During the training phase, the physics based cloth simulator may simulate effects of simulated force on garments in two different resolutions and different levels of detail of wrinkles. For example, the physics based cloth simulator may generate simulated garments in two different resolutions (e.g., different vertex resolutions), where the simulated garment in a higher resolution (e.g., in vertex count) may have more realistic wrinkles (e.g., a higher, enhanced or finer level of detail of wrinkles) than the simulated garment in a lower resolution (e.g., in vertex count). For instance, the simulated garment in a higher resolution may incorporate wrinkles with frequencies higher than (or additional to) those in a simulated garment in a relatively lower resolution. During the training phase, the machine learning model may be set or configured according to physics based simulations with different resolutions and different levels of detail of wrinkles via training (e.g., supervised training). During the runtime phase, the same or a different physics based cloth simulator may simulate effects of simulated force on garments in a low resolution (e.g., 2500 vertices or less) with a low level of detail of wrinkles, and the machine learning model, which is trained with physics based simulations with different (e.g., high and low) resolutions and different levels of detail of wrinkles during the training phase, may enhance the resolution and the level of detail of wrinkles of the physics based simulation.

Advantageously, a combination of a physics based cloth simulator and a machine learning model herein improves efficiency in obtaining simulated garments (or clothes) with realistic detail. In one implementation, a physics based simulation allows prediction of effects of simulated force, for example, gravity or inertia applied to garments according to a body shape, body pose, body movement, clothing material, and environmental factors (e.g., wind, humidity, etc.). However, a physics-based simulation of high resolution meshes (e.g., 10,000 vertices or higher depending on the garment) with realistic detail of wrinkles is computationally expensive and time consuming, and may take several days or weeks. In one aspect, a system, a method, and a non-transitory computer readable medium disclosed herein improve efficiency in obtaining simulated garments (or clothes) with realistic detail by predicting, modeling and/or simulating force(s) applied on garments in a low resolution meshes (e.g., 2500 vertices or less) through a physics based simulation, and by improving resolution and detail of wrinkles in the physics based cloth simulation via a machine learning model. Accordingly, computational resources of a physics based simulation can be conserved by simulating effects of force applied to garments at a low resolution (e.g., 2500 vertices or less), rather than simulating effects of simulated force applied to garments at a high resolution (e.g., 10,000 vertices or higher). Hence, simulated garments with a high resolution with realistic wrinkle details can be generated by a computing device (e.g., a smart phone, a laptop, a personal computer, or a head mounted display) with limited computational resources.

In one aspect, disclosed herein enables rendering realistic garments in real time applications (e.g., video games, or AR, VR, MR applications). For example, simulating the appearance of garments taking into account of force (e.g., gravity or inertia, body movement, and environmental factors such as wind, humidity, etc.) applied on the garments may consume a large amount of computational resources (e.g., processors or storage) and may not be suitable for real time applications. Because of the difficulties in simulating and rendering the realistic appearance of garment with simulated force, the resolution or detail of wrinkles of the simulated garment may be compromised. Such compromised resolution or detail of wrinkles of the simulated garment may degrade user experience, for example, in real time applications (e.g., video games, or AR, VR, MR applications). By simulating wrinkles or other deformations of garments according to simulated force via a physics based simulation and enhancing a resolution and detail of wrinkles in the physics via a machine learning model as disclosed herein, simulated garments with realistic wrinkles or deformations can be rendered in real time applications.

FIG. 1 is a block diagram of a garment simulator 100 for simulating a garment by employing a physics based cloth simulator and a machine learning model, according to an implementation of the present disclosure. In some embodiments, the garment simulator 100 includes a physics based cloth simulator 130 and a machine learning model 150 (sometimes referred to as a trained model or a neural network (e.g., conditional generative adversarial network, convolutional neural network, etc.). In one aspect, the physics based cloth simulator 130 and the machine learning model 150 operate together to simulate and generate images of garments with realistic detail of wrinkles based on simulated force. In some embodiments, the physics based cloth simulator 130, the machine learning model 150 or both are implemented on a hardware, software, or a combination of them. For example, the physics based cloth simulator 130, the machine learning model 150, or both are implemented as a software module executing on one or more processors. For another example, the physics based cloth simulator 130, the machine learning model 150, or both are implemented as a hardware component such as a field programmable gate logic (FPGA) and/or an application specific integrated circuit (ASIC). In some embodiments, the garment simulator 100 includes more, fewer, or different components than shown in FIG. 1.

The physics based cloth simulator 130 is a component that simulates garments with simulated force applied. In some embodiments, the physics based cloth simulator 130 is implemented as an application, program, or executable instructions, executing on one or more processors for instance. The physics based cloth simulator 130 may simulate effects of gravity or inertia applied to garments on a person according to the person's body shape, body pose, body movement, clothing material, and environmental factor (e.g., wind, humidity, etc.), for example, based on a mathematical model. In one approach, the physics based cloth simulator 130 obtains a garment template, a neutral body shape template, and a body pose model, and simulates force applied to the garment according to the neutral body shape and the body pose model to generate a normal map indicating simulated garments modified by simulated force.

The physics based cloth simulator 130 may provide the normal map to the machine learning model 150.

In one aspect, the physics based cloth simulator 130 generates, receives, or obtains garment templates. A garment template is a computer generated three dimensional (3-D) model including a mesh of polygons (e.g., triangles) that collectively represent a garment. In one approach, the physics based cloth simulator 130 generates, receives, and/or obtains garment templates in different resolutions with different levels of detail of wrinkles. For example, the physics based cloth simulator 130 generates, receives, and/or obtains 3-D models having different densities of mesh to obtain templates in different resolutions. According to different templates with different resolutions, the garment simulator 100 (e.g., using the physics based cloth simulator 130) may generate normal maps with different levels of resolutions and different levels of detail of wrinkles.

In one aspect, the physics based cloth simulator 130 generates, receives, or obtains a neutral body shape template and a body pose model, and modifies, changes or transforms the neutral body shape template according to the body pose model to obtain a body shape in one or more poses (e.g., corresponding to a body shape in motion). In one aspect, a neutral body shape template is a computer generated 3-D model including a mesh of polygons (e.g., triangles) that collectively represent a neutral body pose (e.g., T pose). In one aspect, a body pose model is a computer generated skeleton model including j joints which are described by p parameters (e.g., for encoding local transformations and/or bone lengths). To obtain a body shape in motion, the physics based cloth simulator 130 may transform the neutral body template according to the skeleton model by applying a linear blend skinning function at every frame to the neutral body template with v vertices, for example as follows:

$$R^{3\times v} \times R^{pj} \rightarrow R'^{3\times v}$$

where v represents vertices, p represents parameters, j represents joints, and $R'^{3\times v}$ represents a body shape in motion obtained ($\rightarrow$) according to a product of $R^{3\times v}$ corresponding to a neutral body shape template and $R^{pj}$ corresponding to a skeleton model, in one embodiment. According to the body shape in motion, the physics based cloth simulator 130 may simulate garments on the body shape in motion, by generating a plurality (e.g., a sequence) of frames or three-dimensional representations of the garment at different time instances.

In one aspect, the physics based cloth simulator 130 generates, receives, or obtains normal maps based on garment templates and body shapes in motion. For a body shape in motion, the physics based cloth simulator 130 deforms a garment template over time t for the duration of the motion, producing realistic motion and wrinkles to obtain a simulated garment in motion. The physics based cloth simulator 130 may deform the garment template according to dynamics caused by inertia, collision with the body shape in motion, self-collision and other external forces. For example, the physics based cloth simulator 130 performs a short quasi-static simulation to expel the garment from the body shape in motion and to relax the garment on the body shape in motion resulting in a realistic drape. The physics based cloth simulator 130 may apply an inverse linear blend skinning operation to the simulated garment to obtain smooth surfaces of the garment. The physics based cloth simulator 130 may divide the simulated garment into a number of segments, and generate a normal map indicating the segments on a two dimensional (2-D) UV space.

In some embodiments, the physics based cloth simulator 130 generates, receives, or obtains scanned data of a garment, and improves detail of wrinkles on simulated garments by applying the scanned data of the garment. Scanned data of a garment may include an image (e.g., 3-D image, depth image) scanned or acquired from a garment. The physics based cloth simulator 130 may obtain the scanned data from a remote cloud server for instance. In one aspect, the physics based cloth simulator 130 may transfer wrinkle detail in the scanned data onto the simulated garment. The physics based cloth simulator 130 may divide the scanned garment in the scanned data into clusters, and overlay the detail of wrinkles in the clusters of the scanned garment onto corresponding clusters in the simulated garment.

The machine learning model 150 is a component that can receive or obtain normal maps from the physics based cloth simulator 130, and can enhance resolution and detail of wrinkles in the received normal maps. In one aspect, the machine learning model 150 includes a neural network that is set, trained or configured with normal maps with different resolutions and different levels of detail of wrinkles via training (e.g., a supervised training). For example, the machine learning model 150 can receive from the physics based cloth simulator 130, a first normal map with a first resolution (e.g., 2500 vertices or less) and a second normal map with a second resolution (e.g., 10,000 vertices or higher) higher than the first resolution. The machine learning model 150 may apply the first normal map with the lower resolution to the neural network as an input to generate a higher resolution normal map, and compare the normal map generated by the machine learning model 150 with the second normal map received, for example, as a target normal map or a ground truth. The machine learning model 150 may determine, modify or adjust parameters (e.g., coefficients or weights) in the neural network according to the comparison, such that the machine learning model 150 can produce a normal map with a higher resolution and a level of detail of wrinkles close to those of the second normal map. After the machine learning model 150 is adjusted or configured via training based on a plurality of normal map pairs (e.g., more than hundreds, thousands or millions), the machine learning model 150 can generate a normal map with a high resolution (e.g., 10,000 vertices or higher) based on a normal map with a low resolution (e.g., 2500 vertices or less) output from the physics based cloth simulator 130.

In one aspect, the physics based cloth simulator 130 and the machine learning model 150 can operate in two phases: a training phase and a runtime phase. During the training phase, the physics based cloth simulator 130 may simulate or model effects of force applied on garments in two different resolutions and different levels of detail of wrinkles. During the training phase, the machine learning model 150 may be set, trained or configured according to physics based simulations with different resolutions and different levels of detail of wrinkles via training (e.g., supervised training). During the runtime phase, the physics based cloth simulator 130 may simulate effects of simulated force on garments in a low resolution (e.g., 2500 vertices or less) with a low level of detail of wrinkles, but not in a high resolution (e.g., 10,000 vertices or higher) with a high level of detail of wrinkles. During the runtime phase, the machine learning model 150 (trained with physics based simulations with different resolutions and different levels of detail of wrinkles in the training phase) may enhance the output (e.g., low resolution output) of the physics based simulation to improve the resolution and the level of detail of wrinkles. Because the physics based cloth simulator 130 generates the low resolution normal map but not the high resolution normal map during the runtime phase, the garment simulator 100 may avoid the computationally intensive and time consuming physics based simulation of force applied on a garment in a high resolution (e.g., 10,000 vertices or higher). Hence, the garment simulator 100 can be implemented for (e.g., real time) AR, VR, MR applications on a portable electronic device with limited computing resources. Detailed description on the operation of the physics based cloth simulator 130 and the machine learning model 150 during the training phase is provided below with respect to FIGS. 2-3 and 5-9. Detailed description on the operation of the physics based cloth simulator 130 and the machine learning model 150 during the runtime phase is provided below with respect to FIGS. 4-5 and 10-11.

Figure 2:
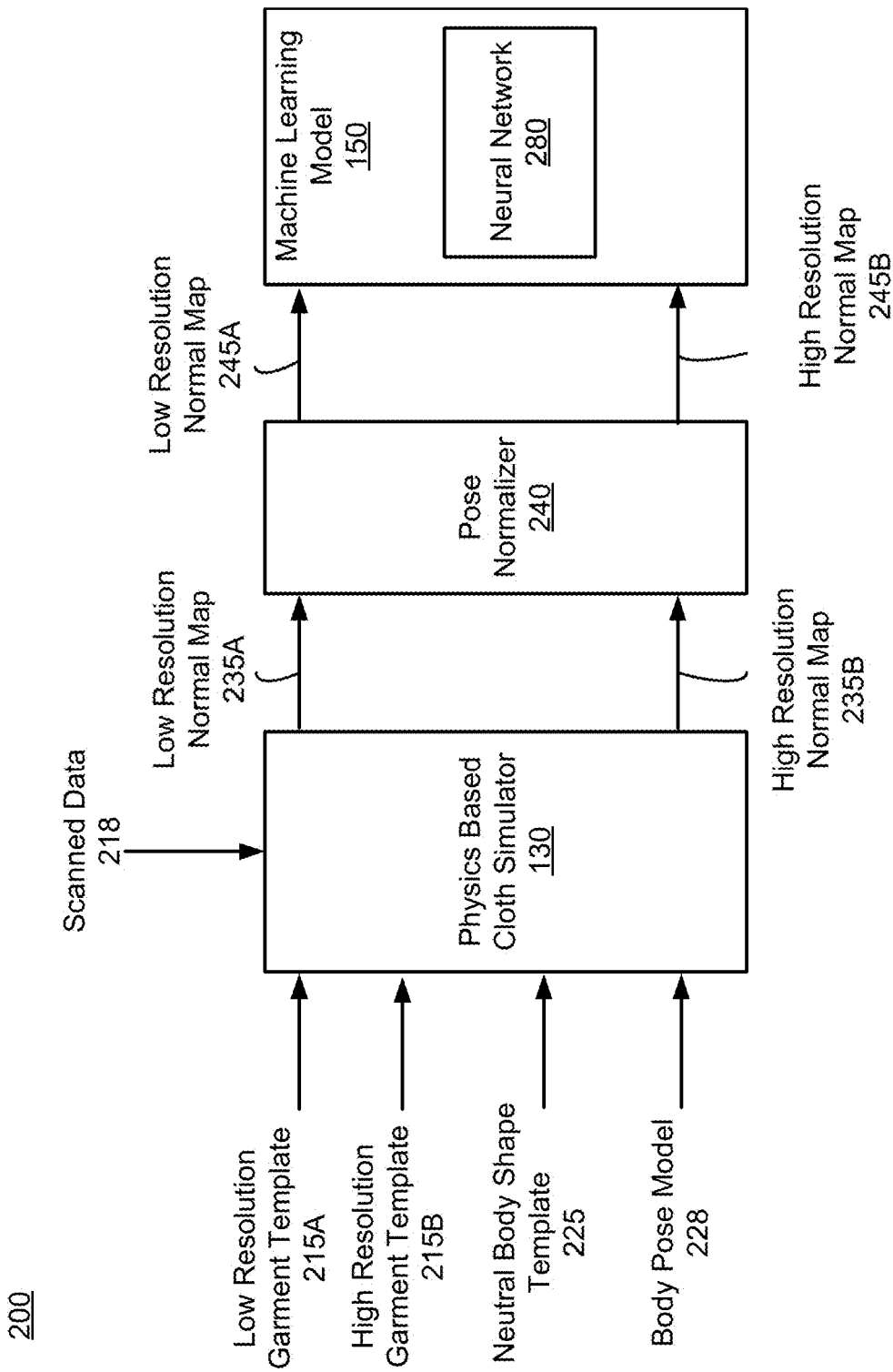
FIG. 2 is a block diagram of a garment simulator in a training phase, according to an example implementation of the present disclosure.

FIG. 2 is a block diagram of a garment simulator 200 in a training phase, according to an implementation of the present disclosure. In some embodiments, the garment simulator 200 is implemented as the garment simulator 100 of FIG. 1. In some embodiments, the garment simulator 200 includes the physics based cloth simulator 130, a pose normalizer 240, and the machine learning model 150. During the training phase, the physics based cloth simulator 130, the pose normalizer 240, and the machine learning model 150 may operate together to generate different normal maps of a simulated garment with different resolutions, and configure or set the machine learning model 150 according to the different normal maps through a supervised training. In some embodiments, the garment simulator 200 includes more, fewer, or different components than those shown in FIG. 2. In some embodiments, the pose normalizer 240 is omitted or integrated as part of the physics based cloth simulator 130.

In some embodiments, the physics based cloth simulator 130 (e.g., interoperating with the pose normalizer 240) receives or obtains a low resolution garment template 215A, a high resolution garment template 215B, a neutral body shape template 225, and a body pose model 228, and generates a low resolution normal map 235A and a high resolution normal map 235B during the training phase. The low resolution garment template 215A includes a mesh of polygons (e.g., triangles) that collectively represent a garment, for example, in 2500 vertices or lower, and the high resolution garment template 215B includes a mesh of polygons (e.g., triangles) that collectively represent a garment, for example, in 10,000 vertices or higher. The high resolution garment template 215B may have a denser mesh of polygons than the low resolution garment template 215A. A neutral body shape template 225 can include a computer generated 3-D model including a mesh of polygons (e.g., triangles) that collectively represent a body shape in a neutral body pose (e.g., T pose). A body pose model 228 is a computer generated skeleton model representing a body pose in motion. The physics based cloth simulator 130 may obtain or model a body shape in motion by modifying the neutral body shape template 225 according to the body pose model 228. The physics based cloth simulator 130 may simulate the low resolution garment template 215A on the body shape in motion to generate (e.g., using or via the pose normalizer 240) the low resolution normal map 235A representing a simulated garment with wrinkles or deformations due to simulated force applied to the garment on the body shape in motion. Similarly, the physics based cloth simulator 130 may simulate the high resolution garment template 215B on the body shape in motion to generate the high resolution normal map 235B representing the simulated garment with wrinkles or deformation due to simulated force applied to the garment on the body shape in motion. Accordingly, the low resolution normal map 235A and the high resolution normal map 235B can have different resolutions with different levels of detail of wrinkles. The physics based cloth simulator 130 and/or the pose normalizer 240 may divide each simulated garment into a number of segments, or identify segments of each simulated garment according to segments defined in the corresponding garment template, and generate a normal map indicating the segments on a two dimensional (2-D) UV space.

In some embodiments, the physics based cloth simulator 130 may receive scanned data 218 of garment, and improve or enhance detail of wrinkles on simulated garments by applying the scanned data of garment to generate the high resolution normal map 235B, during the training phase. Scanned data of garment is a scanned image of a scanned garment. In one aspect, the scanned garment in the scanned data and the simulated garment may not be identical, but may be of a same type (e.g., t-shirt, pants, jacket, etc.) or have similar shapes. The physics based cloth simulator 130 may obtain the scanned data from storage or a database, e.g., from a remote cloud server for instance. In one aspect, the physics based cloth simulator 130 may transfer wrinkle detail in the scanned data onto the simulated garment. The physics based cloth simulator 130 may divide the scanned garment in the scanned data into clusters, and overlay the detail of wrinkles in the clusters of scanned garment onto corresponding portions in the simulated garment. By applying the scanned data, wrinkle details in the simulated garment of the high resolution normal map 235B can be improved.

The pose normalizer 240 receives the low resolution normal map 235A and the high resolution normal map 235B and normalizes the received normal maps to obtain low resolution normal map 245A and high resolution normal map 245B, during the training phase. In one aspect, the pose normalizer 240 removes global body orientation and body pose, and can allow the normal maps to be independent of pose and/or orientation. This can help increase generalization to new motions.

The machine learning model 150 receives normal maps in two resolutions and adjusts or configures parameters (e.g., coefficients or weights) of a neural network 280 of the machine learning model 150 during the training phase. In one approach, the machine learning model 150 receives the low resolution normal map 245A and the high resolution normal map 245B having different resolutions and different levels of detail of wrinkles, and trains the neural network 280 via a supervised training according to the low resolution normal map 245A and the high resolution normal map 245B. For example, the machine learning model 150 configures or adjusts parameters (e.g., coefficients or weights) of the neural network 280, such that the neural network 280 can improve a resolution and detail of wrinkles in low resolution normal map to be close to a resolution and detail of the wrinkles in the high resolution normal map. The machine learning model 150 may iteratively configure or adjust parameters (e.g., coefficients or weights) of the neural network 280 according to training data which can include thousands or millions of normal maps with different resolutions. Detailed description on implementation and operation of the machine learning model 150 is provided below with respect to FIG. 3.

Figure 3:
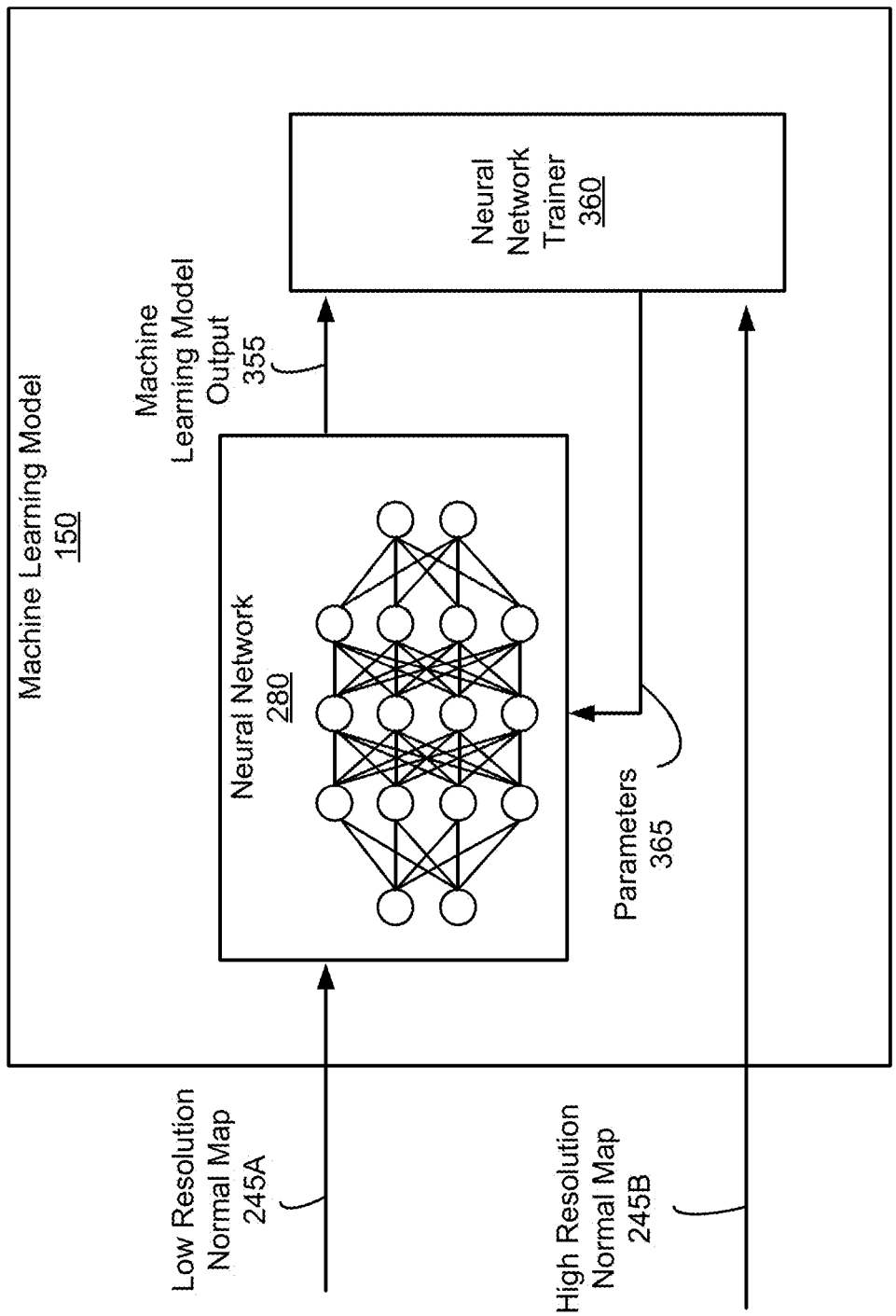
FIG. 3 is a block diagram of a machine learning model of a garment simulator, according to an example implementation of the present disclosure.

FIG. 3 is a block diagram of a machine learning model 150, according to an implementation of the present disclosure. In some embodiments, the machine learning model 150 includes the neural network 280 and a neural network trainer 360. These components operate together to receive training maps (e.g., the low resolution normal map 245A and the high resolution normal map 245B) to adjust or configure parameters 365 (e.g., coefficients or weights) of the neural network 280 during the training phase. Once, the neural network 280 is trained, a low resolution normal map may be applied to the neural network 280 to generate a high resolution normal map during the runtime phase.

The neural network 280 receives the low resolution normal map 245A as an input to generate a higher resolution normal map as a machine learning model output 355. For example, the neural network 280 enhances low frequency features encoded in the low resolution normal map 245A, to introduce or incorporate higher frequency features for instance. In some embodiments, the neural network 280 includes a conditional generative adversarial network (cGAN), which includes a deep neural network architecture that can be trained to generate the machine learning model output 355 with high fidelity by jointly training two competing networks: the generative and discriminative networks. In one aspect, the generative network attempts to fool the discriminative network, whereas the discriminative network is trained to discern real data from generated data.

The neural network trainer 360 can implement and/or utilize the cGAN architecture for image-to-image translation, while conditioning the neural network 280 with normal maps. The neural network trainer 360 may compare the machine learning model output 355 from the neural network 280 with the high resolution normal map 245B, for example, as a target normal map or a ground truth. The machine learning model 150 may determine, modify or adjust parameters 365 (e.g., coefficients or weights) in the neural network 280 according to the comparison such that the neural network 280 can generate the machine learning model output 355 that is closer to the high resolution normal map 245B. To obtain temporal consistency, the neural network trainer 360 may represent a network loss according to generated normal map $I_{gen}$, ground truth examples of current frame $I_{gt}^{t}$, and previous frame $I_{gt}^{t-1}$ in the training set, and adjust or configure parameters 365 (e.g., coefficients or weights) of the neural network to reduce the network loss, thereby reducing flicker noise. The loss L may be represented in one embodiment as below:

$$L = \|I_{gen}^{t} - I_{gt}^{t}\|_1 + |\Sigma_{i,j}(I_{gen}^{t} - I_{gt}^{t-1})_{i,j}|$$

where $I_{gen}^{t}$ is the normal map generated by the machine learning model at frame t, $I_{gt}^{t}$ is the ground truth at frame $I_{gt}^{t-1}$ is the ground truth at frame t−1. In one aspect, $\|I_{gen}^{t} - I_{gt}^{t}\|_1$ is equal to or corresponds to $L_{Data}$, and $|\Sigma_{i,j}(I_{gen}^{t} - I_{gt}^{t-1})_{i,j}|$ is equal to or corresponds to $L_{Temporal}$. In one aspect, $L_{Data}$ is employed to generate images near to ground truth (for less blurring), and $L_{Temporal}$ is employed to capture global fold movements over the surface, and minimize differences between consecutive frames.

Figure 4:
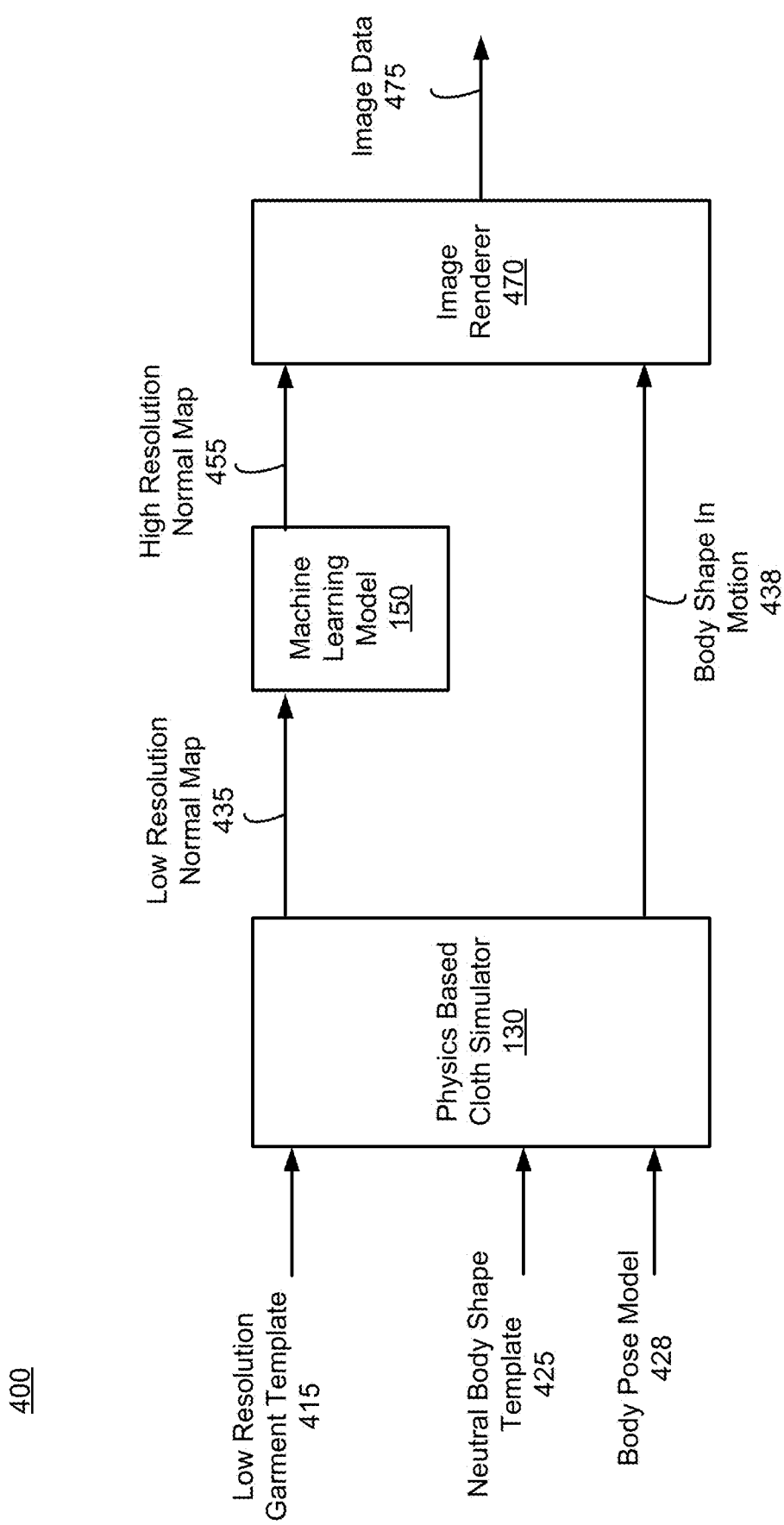
FIG. 4 is a block diagram of a garment simulator in a runtime phase, according to an example implementation of the present disclosure.

FIG. 4 is a block diagram of a garment simulator 400 in a runtime phase, according to an example implementation of the present disclosure. In some embodiments, the garment simulator 400 is implemented as the garment simulator 100 of FIG. 1. In some embodiments, the garment simulator 400 includes the physics based cloth simulator 130, the machine learning model 150, and an image renderer 470. In certain embodiments, the physics based cloth simulator 130 includes or incorporates a pose normalizer 240. The physics based cloth simulator 130, the machine learning model 150, and the image renderer 470 can operate together to receive the low resolution garment template 415, the neutral body shape template 425, and/or the body pose model 428, and can generate a high resolution normal map 455 having a higher resolution and a higher level of detail of wrinkles than a resolution and a level of detail of wrinkles in the low resolution garment template 415. Moreover, the garment simulator 400 may generate image data 475 indicating an image of a simulated garment of the high resolution normal map 455. In some embodiments, the garment simulator 400 includes more, fewer, or different components than shown in FIG. 4.

In some embodiments, the physics based cloth simulator 130 receives or obtains the low resolution garment template 415, a neutral body shape template 425, and/or the body pose model 428, and generates a low resolution normal map 435 during the runtime phase. The low resolution garment template 415 includes a mesh of polygons (e.g., triangles) that collectively represent a garment, for example, in a 2500 or lower resolution in vertex count. A neutral body shape template 425 can include a computer generated 3-D model including a mesh of polygons (e.g., triangles) that collectively represent a neutral body pose (e.g., T pose). A body pose model 428 can include a computer generated skeleton model representing a body pose in motion. To generate the low resolution normal map 435 during the runtime phase, the physics based cloth simulator 130 may operate according to the low resolution garment template 415, the neutral body shape template 425, and the body pose model 428 in a similar manner as the physics based cloth simulator 130 during the training phase, according to the low resolution garment template 215A, the neutral body shape template 225, and the body pose model 228, except the physics based cloth simulator 130 does not generate or provide a high resolution map during the runtime phase.

The machine learning model 150 can receive the low resolution normal map 435 and improve a resolution and detail of wrinkles in the low resolution normal map 435 to obtain or generate a high resolution normal map 455. In one aspect, the machine learning model 150 operates according to parameters 365 (coefficients or weights) of the neural network 280 that are set, adjusted, or configured during the training phase, such that machine learning model 150 can generate the high resolution normal map 455 having a higher resolution and higher level of detail of wrinkles than a resolution and a level of detail of wrinkles in the low resolution normal map 435. The machine learning model 150 may provide the high resolution normal map 455 to the image renderer 470.

The image renderer 470 can receive the high resolution normal map 455 from the machine learning model 150 and a body shape in motion 438 from the physics based cloth simulator 130, and can generate an image data 475 indicating an image of the simulated garment of the high resolution normal map 455 on the body shape in motion 438. In one approach, the image renderer 470 constructs the simulated garment from the high resolution normal map 455 by laying or disposing segments of the simulated garment in the high resolution normal map 455 on corresponding locations of the body shape in motion 438. The image renderer 470 may generate the image data 475 indicating the constructed simulated garment on the body shape in motion 438, and provide the image data 475 to a display device or a graphics driver for rendering a visual representation of the simulated garment.

In one aspect, the garment simulator 400 can obtain the high resolution normal map 455 of a realistic simulated garment in a computationally efficient manner (e.g., in real time or near real time). In particular, the physics based cloth simulator 130 may simulate effects of simulated force applied to a garment in a low resolution (e.g., 2500 vertices), and the machine learning model 150 may enhance a resolution and detail of wrinkles of the simulated garment from the physics based cloth simulator 130. Because the physics based cloth simulator 130 generates the low resolution normal map 435 but not the high resolution normal map during the runtime phase, the garment simulator 400 may omit (e.g., the computationally intensive and time consuming) physics based simulation of force applied on a garment in a high resolution (e.g., 10,000 vertices). Hence, the garment simulator 400 may be implemented by a portable electronic device with limited computing resources suitable to provide AR, VR, MR capability and/or experience.

FIG. 5 is a flow chart illustrating a process 500 of training a machine learning model of a garment simulator, according to an example implementation of the present disclosure. In some embodiments, the process 500 is performed by one or more processors, on which the garment simulator 200 of FIG. 2 is executed. In some embodiments, the process 500 is performed by other entities. In some embodiments, the process 500 includes more, fewer, or different steps than shown in FIG. 5.

The one or more processors can generate 510, via a physics based cloth simulator (e.g., physics based cloth simulator 130 of FIGS. 2 and/or 4), a first normal map of a simulated garment having a first level of detail of wrinkles, and generate 520, by the physics based cloth simulator, a second normal map of the simulated garment having a second level of detail of wrinkles. In one approach, the one or more processors can receive, via the physics based cloth simulator, a first garment template of a garment having a first resolution, and a second garment template of the garment having a second resolution higher than the first resolution. The one or more processors may deform, via the physics based cloth simulator, the first garment template according to simulated force applied to the first garment template, to generate the first normal map, and deform, via the physics based cloth simulator, the second garment template according to the simulated force applied to the second garment template, to generate the second normal map. Optionally, the one or more processors can receive scanned data of a garment having a resolution equal to or higher than the second resolution, and can generate the second normal map by overlaying wrinkle details in the scanned data onto the simulated garment. The one or more processors may divide the simulated garments to two or more segments in a two dimensional UV space to generate normal maps.

The one or more processors can provide 530 the first normal map and the second normal map as inputs to a machine learning model (e.g., machine learning model 150 of FIG. 2). The one or more processors can configure 540 the machine learning model via a supervised training such that the machine learning model can generate an output normal map with a level of detail of wrinkles higher than that of an input normal map. In some embodiments, the machine learning model includes a neural network that receives the first normal map as an input and generates an output normal map according to the first normal map and parameters (e.g., coefficients or weights) of the neural network. The one or more processors may compare the output of the neural network against the second normal map, and adjust or configure the parameters (e.g., coefficients or weights) of the neural network according to the comparison such that the neural network can generate a subsequent output normal map that is closer to the second normal map than the compared output normal map. In one aspect, each normal map is divided into a plurality of segments. The one or more processors may apply each corresponding segment of the plurality of segments as an input to the machine learning model to generate a corresponding plurality of output segments having a level of detail of wrinkles higher than that of the corresponding segment. The one or more processors may iteratively adjust or configure parameters of the neural network according to a larger number (e.g., more than thousands) of normal maps with different resolutions and different levels of wrinkle details as a training set.

Figure 6B:
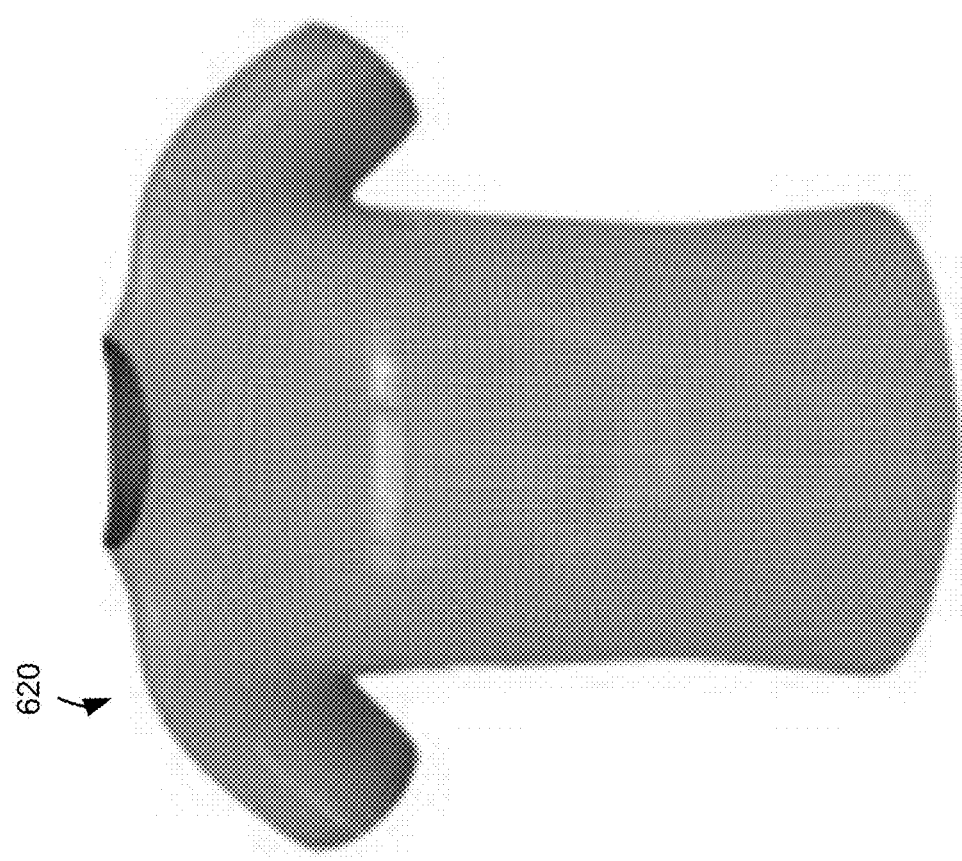
FIG. 6B illustrates an example high resolution template of the same garment applied to the physics based cloth simulator, to which the low resolution template in FIG. 6A is applied, according to an example implementation of the present disclosure.
Figure 6A:
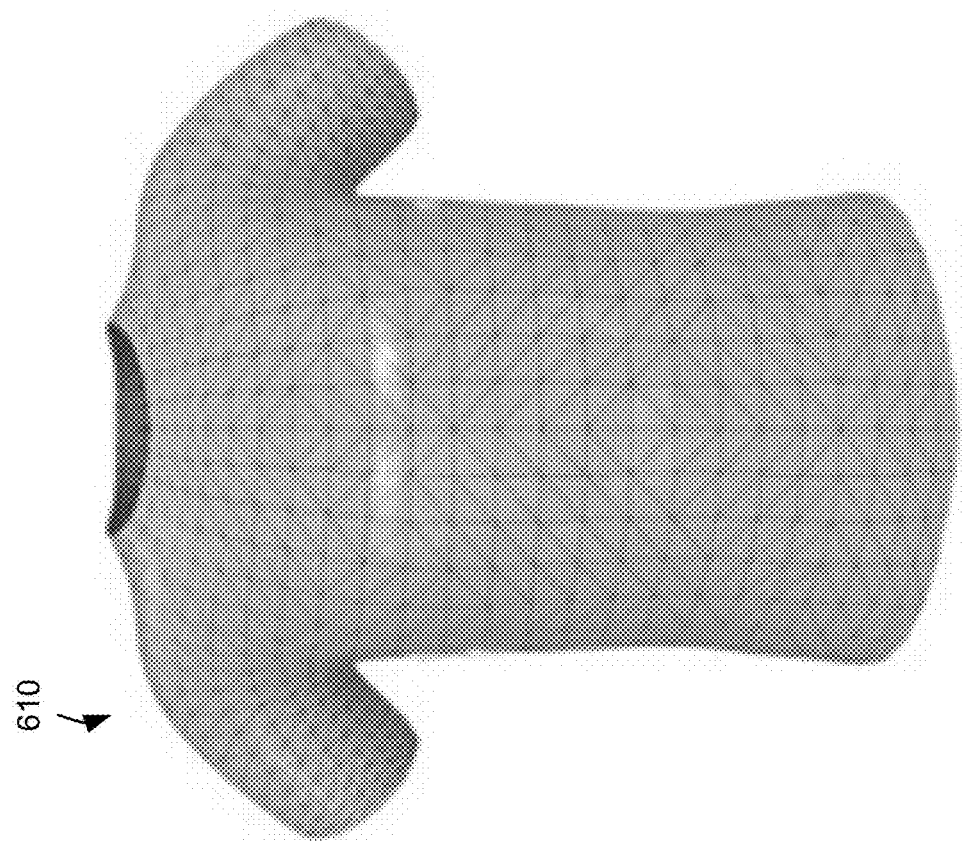
FIG. 6A illustrates an example low resolution template of a garment applied to a physics based cloth simulator, according to an example implementation of the present disclosure.

FIG. 6A illustrates an example low resolution garment template 610 of a t-shirt, and FIG. 6B illustrates an example high resolution garment template 620 of the t-shirt, according to an example implementation of the present disclosure. The low resolution garment template 610 and the high resolution garment template 620 may be applied to the physics based cloth simulator 130 to obtain normal maps of a simulated t-shirt with different resolutions and different levels of detail of wrinkles. The low resolution garment template 610 can include a mesh of triangles that collectively represent a t-shirt. The high resolution garment template 620 may be similar to the low resolution garment template 610, except the high resolution garment template 620 has a higher density of mesh than the low resolution garment template 610.

Figure 6C:
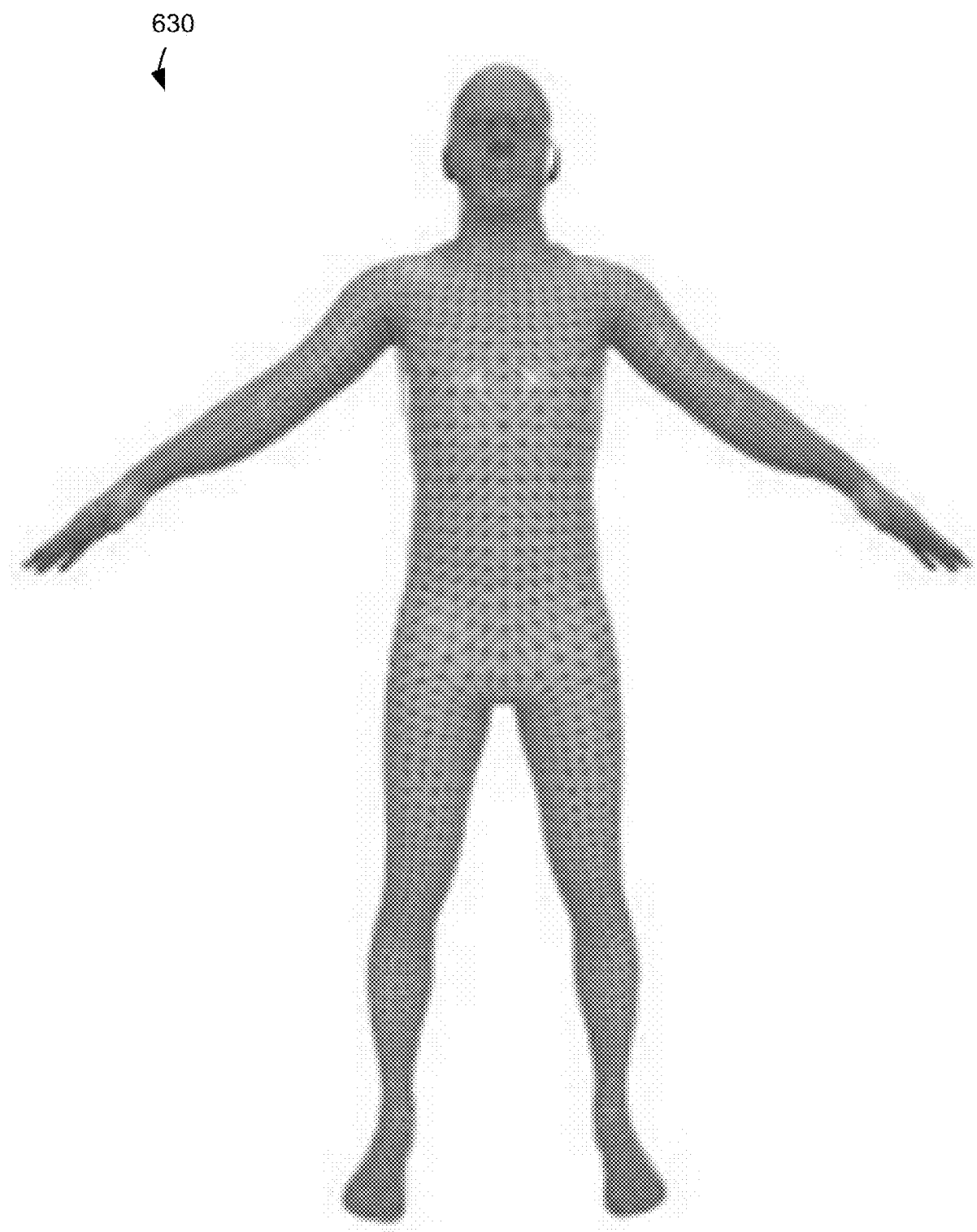
FIG. 6C illustrates an example neutral body shape template applied to the physics based cloth simulator, to which the low resolution template in FIG. 6A is applied, according to an example implementation of the present disclosure.

FIG. 6C illustrates an example neutral body shape template 630, according to an implementation of the present disclosure. The neutral body shape template 630 may be applied to the physics based cloth simulator 130 to obtain a normal map of a simulated t-shirt. The neutral body shape template 630 can include a mesh of triangles that collectively represent a body shape of a person, for example, in a neutral body pose (e.g., T pose). In one aspect, the physics based cloth simulator 130 may integrate a body pose model (e.g., a skeleton model) representing a body pose in motion, with the neutral body shape template 630, and can obtain a body shape in motion. The physics based cloth simulator 130 can then simulate the low resolution garment template 610 on the body shape in motion. The physics based cloth simulator 130 (e.g., incorporating a pose normalizer 240) may divide the simulated t-shirt of the low resolution garment template 610 into a number (e.g., four) of segments to generate a low resolution normal map. Similarly, the physics based cloth simulator 130 can simulate the high resolution garment template 620 on the body shape in motion. The physics based cloth simulator 130 may divide the simulated t-shirt of the high resolution garment template 620 into the same number (e.g., four) of segments to generate a high resolution normal map having a higher resolution and a higher level of detail of wrinkles than the low resolution normal map. The low resolution normal map and the high resolution normal map may be represented on a two dimensional (2-D) UV space.

Figure 7:
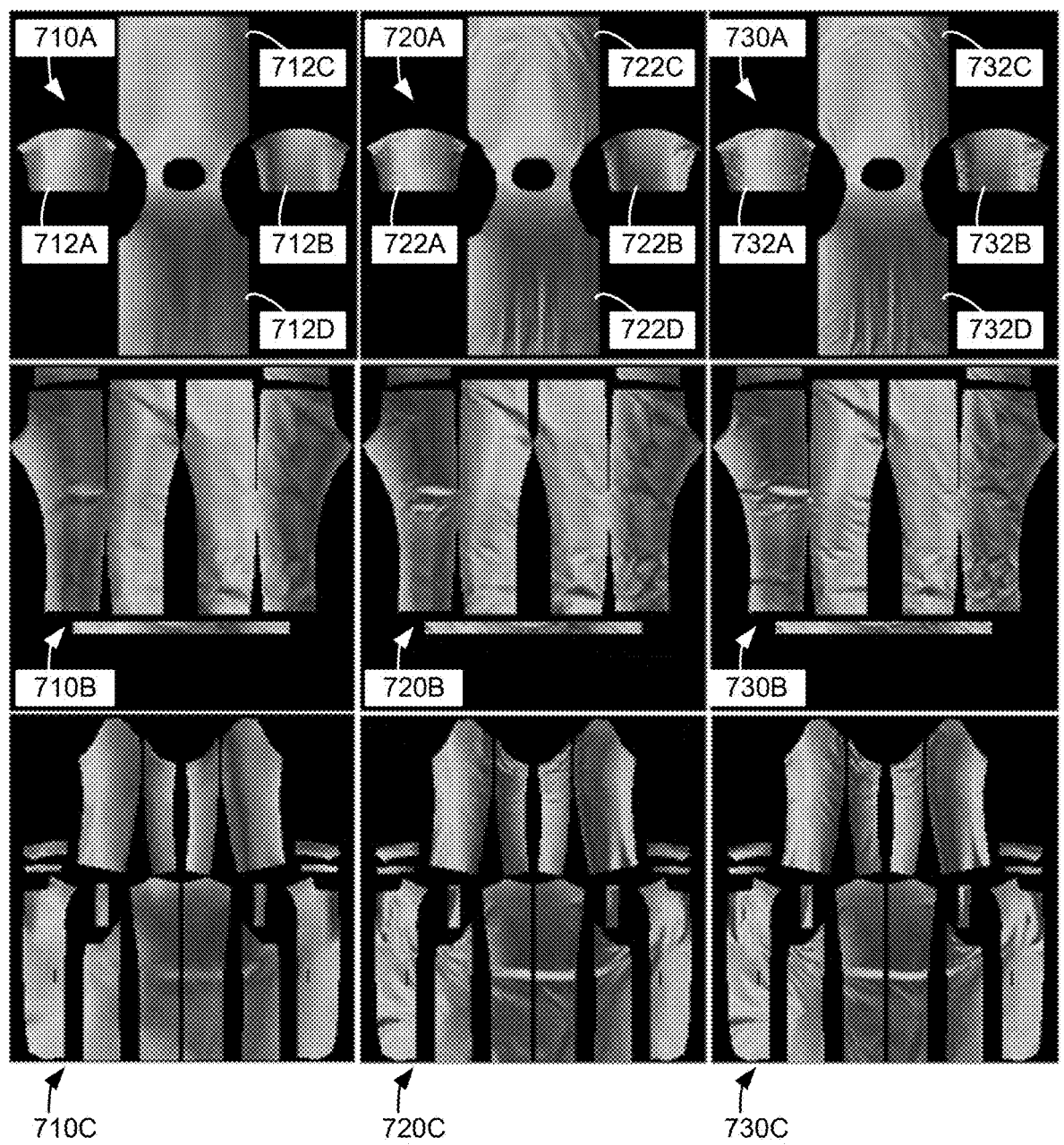
FIG. 7 illustrates example normal maps generated by a physics based cloth simulator, according to an example implementation of the present disclosure.

FIG. 7 illustrates example normal maps 710A-710C, 720A-720C generated by a physics based cloth simulator and ground truth references 730A-730C, according to an implementation of the present disclosure. For example, the normal map 710A is a low resolution normal map of a t-shirt divided into four segments 712A, 712B, 712C, 712D on a 2-D UV space; the normal map 720A is a high resolution normal map of the t-shirt divided into four segments 722A, 722B, 722C, 722D on the 2-D UV space; and the ground truth reference 730A is a ground truth example of the t-shirt divided into four segments 732A, 732B, 732C, 732D on the 2-D UV space. The normal map 710B is a low resolution normal map of a pair of pants divided into seven segments on a 2-D UV space; the normal map 720B is a high resolution normal map of the pair of pants divided into seven segments on the 2-D UV space; and the ground truth reference 730B is a ground truth example of the pair of pants divided into four segments on the 2-D UV space, for instance. The normal map 710C is a low resolution normal map of a blazer divided into sixteen segments on a 2-D UV space; the normal map 720C is a high resolution normal map of the blazer divided into sixteen segments on the 2-D UV space; and the ground truth reference 730C is a ground truth example of the blazer divided into sixteen segments on the 2-D UV space, for example. As shown in FIG. 7, the high resolution normal maps 720A, 720B, 720C are closer to the ground truth references 730A, 730B, 730C, and have higher resolution and detail of wrinkles than the low resolution normal maps 710A, 710B, 710C. In one aspect, loss terms $L_{Data}$ and $L_{Temporal}$ of the high resolution normal maps of t-shirt, pants, and blazer computed as averages over a validation set are obtained as below. Such low levels of loss terms indicate that the high resolution normal maps obtained through a combination of a physics based cloth simulator and a machine learning model are close to the ground truth.

TABLE 1

Loss terms

|  | T-shirt | Pants | Blazer |
|---|---|---|---|
| $L_{Data}$ | 5.2573 | 4.1740 | 7.4259 |
| $L_{Temporal}$ | 5.2945 | 4.1818 | 7.4553 |

Figure 8:
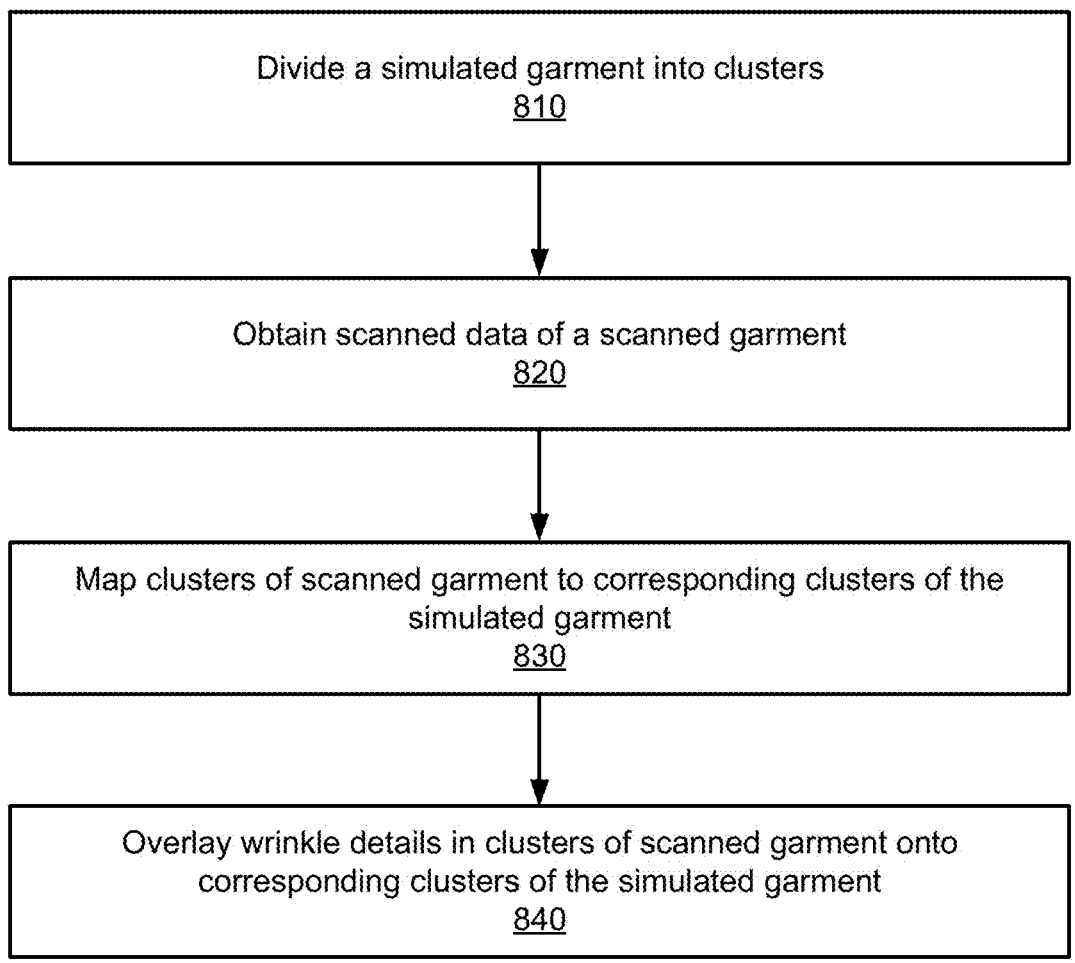
FIG. 8 is a flow chart illustrating a method of augmenting wrinkle details in scanned data of a garment for training a garment simulator, according to an example implementation of the present disclosure.

FIG. 8 is a flow chart illustrating a process 800 of augmenting wrinkle details in scanned data of a garment for training a garment simulator, according to an example implementation of the present disclosure. The process 800 may be performed by one or more processors, on which the garment simulator 200 of FIG. 2 is executed. In some embodiments, the process 800 is performed by other entities. In some embodiments, the process 800 includes more, fewer, or different steps than shown in FIG. 8.

The one or more processors can divide 810 a simulated mesh of garment into clusters. In one aspect, a number of clusters may be different than a number of segments of simulated garment in a normal map.

The one or more processors obtain 820 scanned data of garment. Scanned data of garment is a scanned image of a scanned garment. The scanned data may be obtained from a remote server. The scanned garment and the simulated garment may not be identical, but may have similar shapes, textures, or poses.

The one or more processors map 830 clusters of scanned garment to corresponding clusters of the simulated garment. The one or more processors may identify, for each cluster of scanned garment, a cluster of the simulated garment proximate to the cluster of scanned garment. A single cluster of scanned garment may be mapped to one or more clusters of simulated garment, or one or more clusters of the scanned garment may be mapped to a single cluster of the simulated garment. By transferring wrinkle details in clusters rather than the full garment, wrinkle details in the scanned data can be transferred or overlaid onto the simulated garment with less noise and better alignment compared to transferring wrinkle details in the full garment.

In one aspect, the one or more processors may transfer or overlay 840 wrinkle detail in clusters of scanned garment onto corresponding clusters of the simulated garment. For example, the one or more processors may identify, for each bent, deformed or wrinkled portion in the simulated garment, a closest captured point in a chunk of the scanned garment, and can estimate dihedral angle of triangles to match the identified captured point. The one or more processors may apply the dihedral angle as a penalty term of deforming the garment template.

In one example, the simulated garment is divided into N topologically connected disjoint clusters $C_i$, $Y_H(t) = U_{i=0...N-1} C_i$. At the start of every frame, the closest point in the cloud (e.g., 3-D surface or point cloud of the simulated garment) for every vertex may be found on the garment by using a kd-tree for instance. The corresponding point clusters of the point cloud may be aligned using Procrustes analysis for example. For every cluster i, the linear transformation Ti that minimizes the distance in the least squares sense of the projection of the point cloud cluster $X_{C,i}$ onto the corresponding garment cluster $X_i$ (vertex positions of $C_i$) is found:

$$\min_{T_i} \|(X_{c,i} T_i - X_i)^T (X_{c,i} T_i - X_i)\|.$$

Corresponding angles in the cluster can be computed and set as the reference bend angle. To prevent oscillations, additional damping may be added to the bend constraints in the triangle normal direction whenever the rest angle is updated. For example, for every adjacent triangle pair (x1, x3, x2) and (x1, x2, x4) with updated rest angle $\phi_{PC}$ extracted from the point cloud, the following constraint can be solved.

$$C_{bend}(x_1, x_2, x_3, x_4) = \operatorname{acos}\left(\frac{x_{2,1} \times x_{3,1}}{|x_{2,1} \times x_{3,1}|} \cdot \frac{x_{2,1} \times x_{4,1}}{|x_{2,1} \times x_{4,1}|}\right) - \phi_{PC}.$$

By enhancing wrinkle details of simulated garment with scanned data, the machine learning model 150 can be trained to generate normal maps with improved realism.

Figure 9:
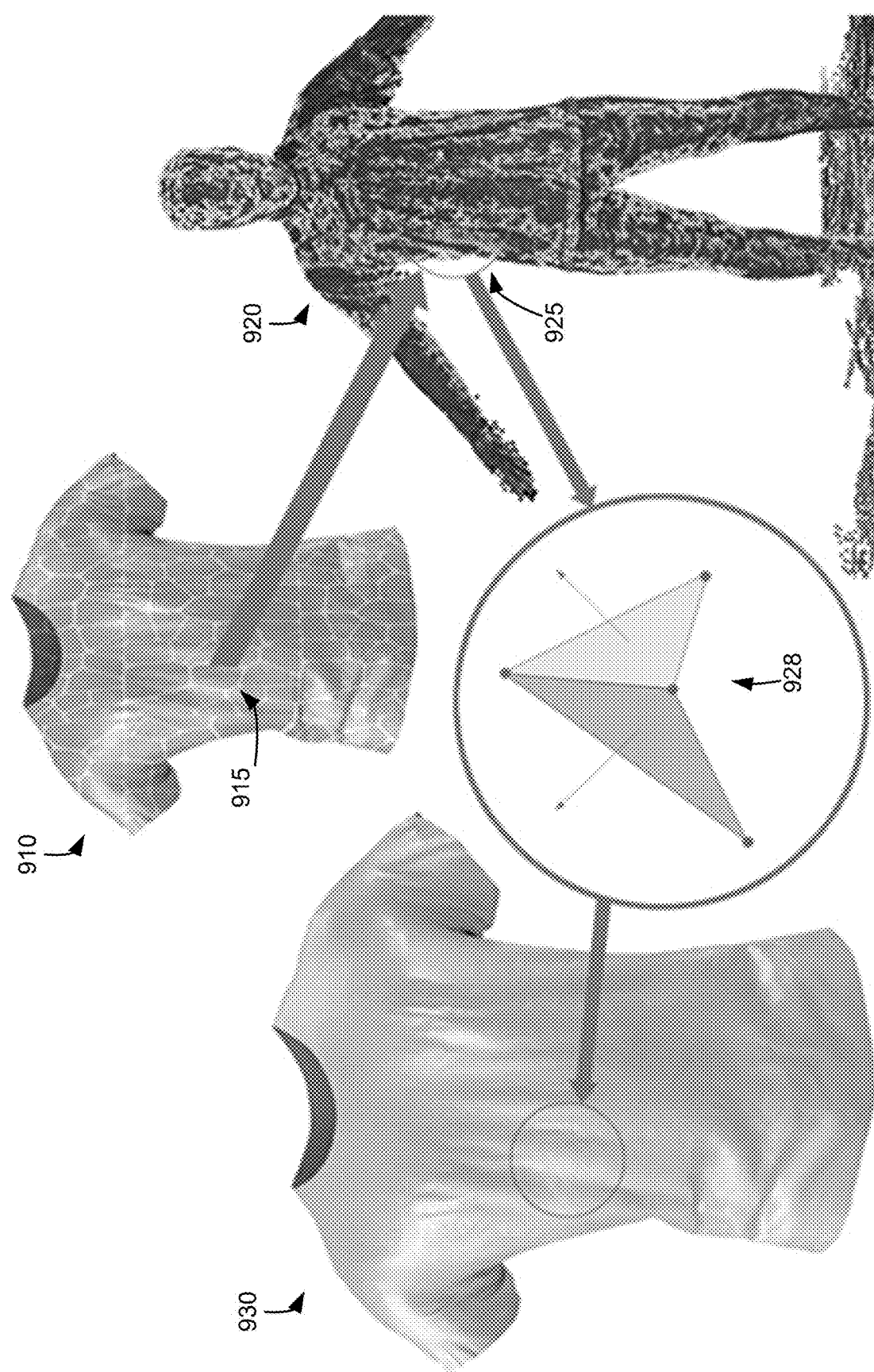
FIG. 9 shows an example of a scanned garment applied to improve a resolution and detail of wrinkles in a simulated garment, according to an example implementation of the present disclosure.

FIG. 9 shows an example of a scanned garment 920 that is applied to improve a resolution and detail of wrinkles in a simulated garment 910, according to an example implementation of the present disclosure. In one example, the simulated garment 910 of a normal map is divided into a plurality of clusters, and the scanned garment 920 of scanned data is divided into a plurality of clusters. A cluster 915 of the simulated garment 910 may be mapped to a cluster 925 of the scanned garment 920 proximately located to the cluster 915. Dihedral angle of triangles 928 can be estimated to match a corresponding point in the cluster 925. The simulated garment can be modified or improved according to the estimated dihedral angle to obtain the improved simulated garment 930. In some embodiments, a segment of a simulated garment corresponds to one or more clusters.

FIG. 10 is a flow chart illustrating a process 1000 of rendering a simulated garment by a garment simulator, according to an example implementation of the present disclosure. The process 1000 may be performed by one or more processors, on which the garment simulator 400 of FIG. 4 is executed. In some embodiments, the process 1000 is performed by other entities. In some embodiments, the process 1000 includes more, fewer, or different components than shown in FIG. 10.

The one or more processors can generate 1010, via a physics based cloth simulator (e.g., physics based cloth simulator 130), a first normal map of a simulated garment having a first level of detail of wrinkles. The first normal map may have a low resolution (e.g., 2500 vertices or less).

In one aspect, the physics based cloth simulator may be trained as described above with respect to any one or more of FIGS. 2-5 and 8-9.

The one or more processors can apply 1020 the first normal map as an input to a machine learning model (e.g., machine learning model 150) to generate a second normal map having a second level of detail of wrinkles. The second normal map may have a higher resolution (e.g., 10,000 vertices or higher) than the resolution of the first normal map.

The one or more processors can render 1030, using the second normal map, an image of the simulated garment having the second level of detail of wrinkles. In one approach, the one or more processors can obtain a body shape in motion, for example, from the physics based cloth simulator, and can generate image data including or corresponding to an image of the simulated garment of the high resolution normal map on the body shape in motion. In one approach, the one or more processors may lay or dispose segments of the simulated garment in the high resolution normal map on corresponding locations of the body shape in motion, and can generate image data including or corresponding to the constructed simulated garment on the body shape in motion. The one or more processors may provide the image data to a display device or a graphics driver to render the image of the simulated garment. By generating the low resolution normal map via the physics based cloth simulation and improving the resolution and a level of detail of wrinkles in the low resolution normal map via the machine learning model, physics based cloth simulation of high resolution normal map can be obviated to achieve computational efficiency and/or real time (or near real time) processing.

Figure 11A:
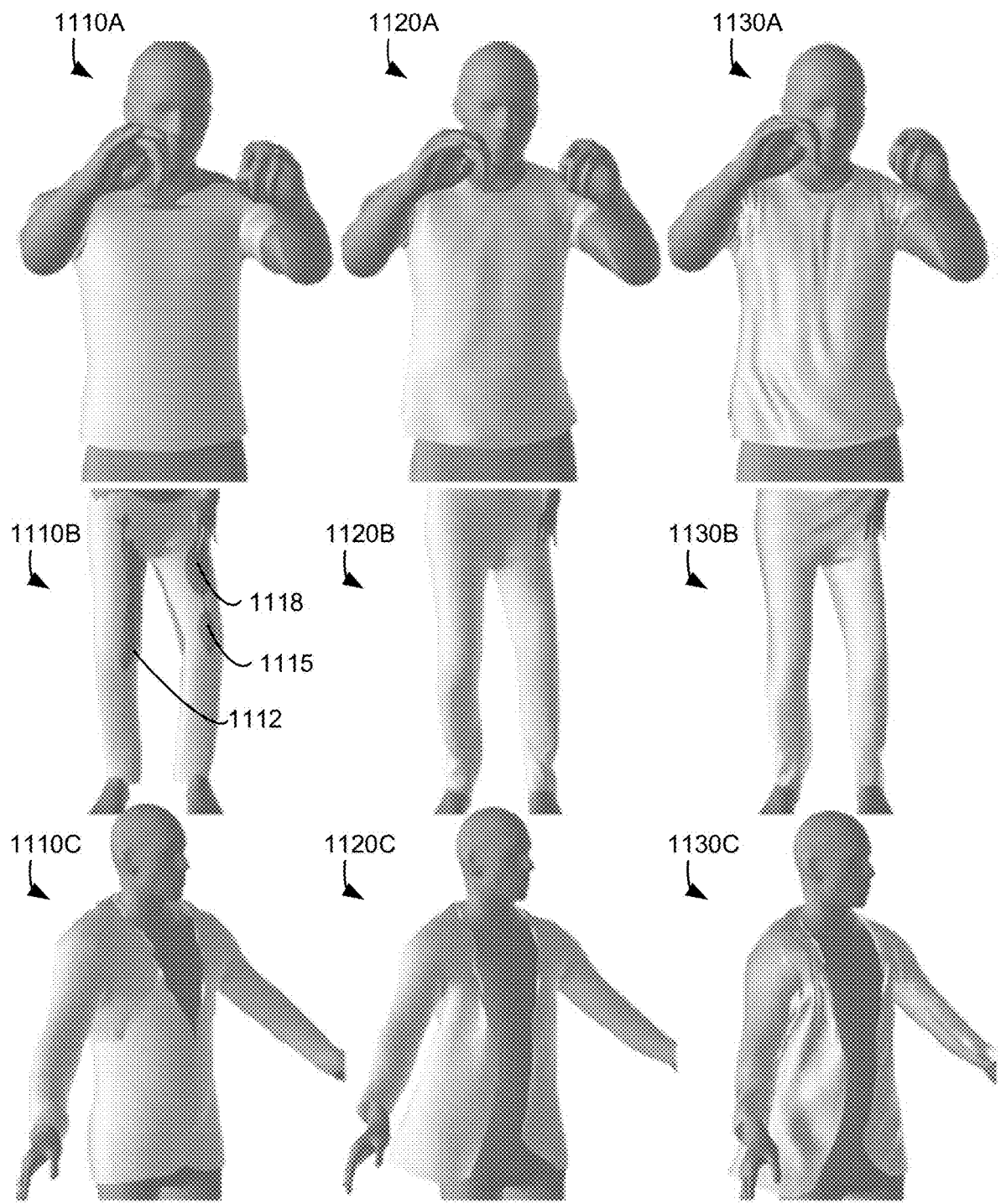
FIG. 11A shows examples of rendered simulated garments generated by various example implementations of the present disclosure.

FIG. 11A shows examples of rendered simulated garments 1110A-1110C, 1120A-1120C, and 1130A-1130C generated by various implementations of the present disclosure. For example, the simulated garment 1110A is a simulated t-shirt obtained through a linear blending, the simulated garment 1120A is a simulated t-shirt constructed based on a low resolution normal map output by the physics based cloth simulator 130, and the simulated garment 1130A is a simulated t-shirt constructed based on a high resolution normal map output by the machine learning model 150. The simulated garment 1110B is a simulated pair of pants obtained through a linear blending, the simulated garment 1120B is a simulated pair of pants constructed based on a low resolution normal map output by the physics based cloth simulator 130, and the simulated garment 1130B is a simulated pair of pants constructed based on a high resolution normal map output by the machine learning model 150, for instance. The simulated garment 1110C is a simulated blazer obtained through a linear blending, the simulated garment 1120C is a simulated blazer constructed based on a low resolution normal map output by the physics based cloth simulator 130, and the simulated garment 1130C is a simulated blazer constructed based on a high resolution normal map output by the machine learning model 150, for example. As shown in FIG. 11A, simulated garments obtained through linear blending suffers from collisions 1112, 1115, 1118. The simulated garments 1120A-1120C obtained based on the low resolution normal maps output by the physics based cloth simulator 130 can be free from collisions, but can lack wrinkle details. The simulated garments 1130A-1130C obtained based on the high resolution normal maps output by the machine learning model 150 can provide realism with improved wrinkle details compared to the simulated garments 1110A-1110C obtained based on the linear blending and the simulated garments 1120A-1120C obtained based on the low resolution normal maps output by the physics based cloth simulator 130.

Figure 11B:
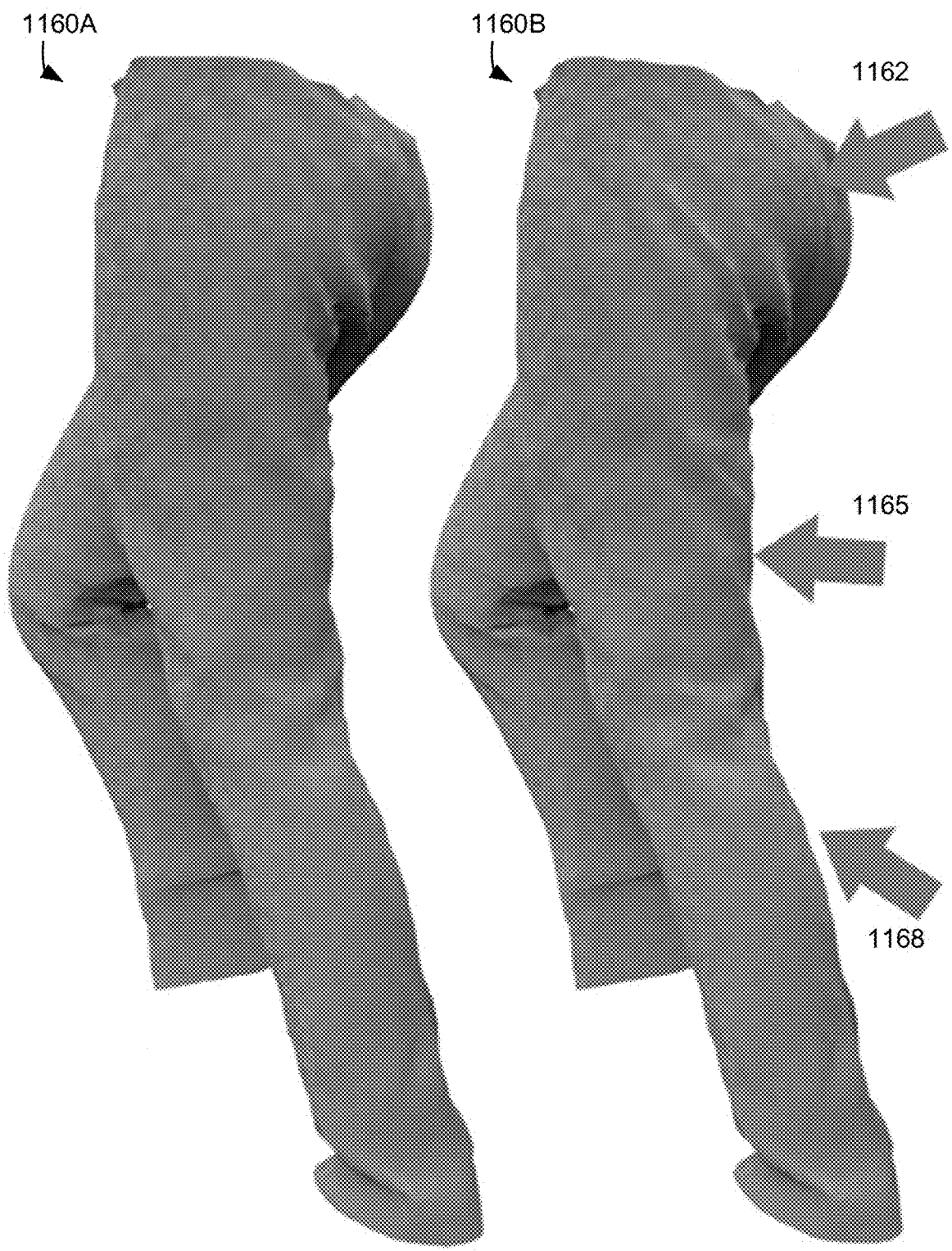

FIG. 11B shows effects of augmenting wrinkle details according to scanned data. Specifically, FIG. 11B shows a simulated pair of pants 1160A rendered according to a normal map output by the machine learning model 150, which is trained according to high resolution normal maps without augmentation of wrinkle details from scanned data. FIG. 11B also shows a simulated pair of pants 1160B rendered according to a normal map output by the machine learning model 150, which is trained according to high resolution normal maps augmented with wrinkle details from scanned data. Compared to the simulated pair of pants 1160A, the simulated pair of pants 1160B benefits from additional wrinkle details 1162, 1165, 1168 by training the machine learning model 150 according to a high resolution normal map augmented with wrinkle details from scanned data, as described above with respect to for instance FIGS. 2, 8 and/or 9.

Similarly, FIG. 11C shows effects of augmenting wrinkle details according to scanned data. Specifically, FIG. 11C shows a simulated t-shirt 1180A rendered according to a normal map output by the machine learning model 150, which is trained according to high resolution normal maps without augmentation of wrinkle details from scanned data. FIG. 11C also shows a simulated t-shirt 1180B rendered according to a normal map output the machine learning model 150, which is trained according to high resolution normal maps with augmentation of wrinkle details from scanned data. Compared to the simulated t-shirt 1180A, the simulated t-shirt 1180B benefits from additional wrinkle details 1182, 1185, 1188 by training the machine learning model 150 according to a high resolution normal map augmented with wrinkle details from scanned data.

Figure 12:
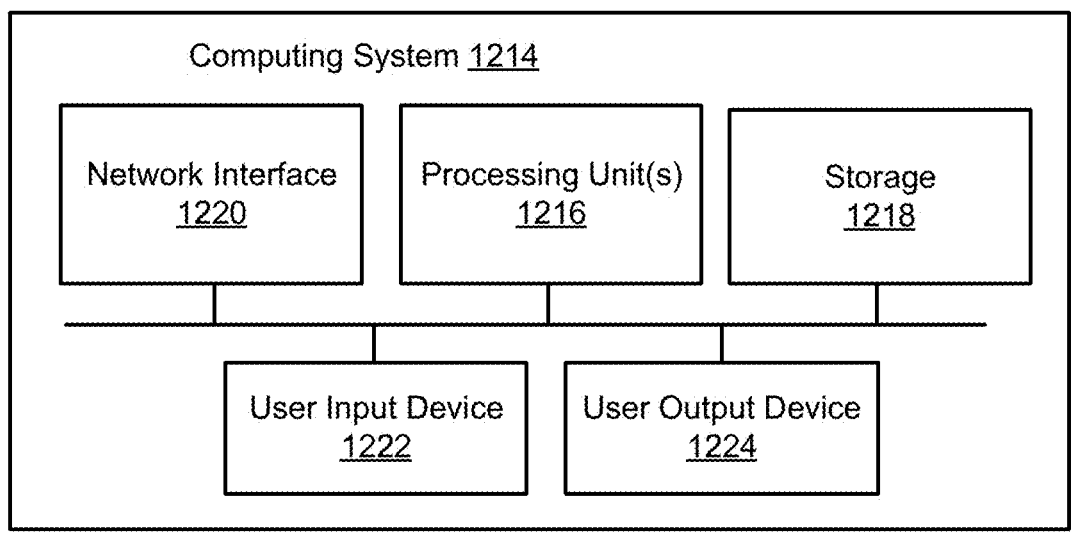
FIG. 12 is a block diagram of a computing environment according to an example implementation of the present disclosure.

Various operations described herein can be implemented on computer systems. FIG. 12 shows a block diagram of a representative computing system 1214 usable to implement the present disclosure. In some embodiments, the garment simulator 100 of FIG. 1 is implemented by the computing system 1214. Computing system 1214 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 1214 can be implemented to provide VR, AR, MR experience. In some embodiments, the computing system 1214 can include conventional computer components such as processors 1216, storage device 1218, network interface 1220, user input device 1222, and user output device 1224.

Network interface 1220 can provide a connection to a wide area network (e.g., the Internet) to which WAN interface of a remote server system is also connected. Network interface 1220 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 1222 can include any device (or devices) via which a user can provide signals to computing system 1214; computing system 1214 can interpret the signals as indicative of particular user requests or information. User input device 1222 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 1224 can include any device via which computing system 1214 can provide information to a user. For example, user output device 1224 can include a display to display images generated by or delivered to computing system 1214. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 1224 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 1216 can provide various functionality for computing system 1214, including any of the functionality described herein as being performed by a server or client, or other functionality associated with message management services.

It will be appreciated that computing system 1214 is illustrative and that variations and modifications are possible. Computer systems used in connection with the present disclosure can have other capabilities not specifically described here. Further, while computing system 1214 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
generating, by a physics based cloth simulator executing on one or more processors, a first normal map of a simulated garment having a first level of detail of wrinkles and a second normal map of the simulated garment having a second level of detail of wrinkles higher than the first level of detail of wrinkles;
providing, by the one or more processors, the first normal map and the second normal map as inputs to train a machine learning model; and
configuring, by the one or more processors via training, the machine learning model to generate a fourth normal map as an output, in response to a third normal map applied to the machine learning model as an input, the fourth normal map having a level of detail of wrinkles higher than that of the third normal map.

2. The method of claim 1, further comprising:
receiving, by the physics based cloth simulator, a first garment template of a garment having a first resolution, and a second garment template of the garment having a second resolution higher than the first resolution;
generating, by the physics based cloth simulator, the first normal map by deforming the first garment template according to simulated force applied to the first garment template; and
generating, by the physics based cloth simulator, the second normal map by deforming the second garment template according to the simulated force applied to the second garment template.

3. The method of claim 2, further comprising:
receiving, by the one or more processors, scanned data of the garment having a resolution equal to or higher than the second resolution; and generating, by the one or more processors, the second normal map by applying the scanned data of the garment to the second garment template.

4. The method of claim 1, further comprising:
generating, by the physics based cloth simulator, for a body pose corresponding to an instance of motion, the simulated garment having the first level of detail of wrinkles and the simulated garment having the second level of detail of wrinkles;
generating, by the physics based cloth simulator for input to the machine learning model, the first normal map and the second normal map by normalizing the simulated garment having the first level of detail of wrinkles and the simulated garment having the second level of detail of wrinkles, based on a reference body pose different from the body pose corresponding to the instance of motion.

5. The method of claim 1, wherein the first normal map and the second normal map have a common UV space.

6. The method of claim 1, further comprising:
generating, by the physics based cloth simulator, the third normal map of the simulated garment having the first level of detail of wrinkles;
applying, by the one or more processors, the third normal map as the input to the machine learning model to generate the fourth normal map having the second level of detail of wrinkles higher than the first level of detail of wrinkles; and
rendering, by the one or more processors using the fourth normal map, an image of the simulated garment having the second level of detail of wrinkles.

7. A method comprising:
generating, by a physics based cloth simulator executing on one or more processors, a first normal map of a simulated garment having a first level of detail of wrinkles;
applying, by the one or more processors, the first normal map as an input to a machine learning model to generate a second normal map having a second level of detail of wrinkles higher than the first level of detail of wrinkles; and
rendering, by the one or more processors using the second normal map, an image of a three dimensional model including the simulated garment having the second level of detail of wrinkles.

8. The method of claim 7, wherein the machine learning model is trained by providing i) a third normal map of the simulated garment having the first level of detail of wrinkles generated by the physics based cloth simulator and ii) a fourth normal map of the simulated garment having the second level of detail of wrinkles generated by the physics based cloth simulator, as inputs to the machine learning model.

9. The method of claim 7, further comprising:
receiving, by the physics based cloth simulator, a garment template of a garment; and
deforming, by the physics based cloth simulator, the garment template according to simulated force applied to the garment template, to generate the first normal map.

10. The method of claim 9, further comprising:
dividing the deformed garment template into a plurality of segments to generate the first normal map.

11. The method of claim 10, further comprising:
applying, by the one or more processors, each corresponding segment of the plurality of segments as an input to the machine learning model to generate a corresponding plurality of output segments having a level of detail of wrinkles higher than that of the corresponding segment.

12. The method of claim 11, further comprising:
combining, by the one or more processors, the corresponding plurality of output segments to render the image of the simulated garment.

13. A system comprising:
one or more processors configured to:
generate, via a physics based cloth simulator executing on the one or more processors, a first normal map of a simulated garment having a first level of detail of wrinkles;
apply the first normal map as an input to a machine learning model to generate a second normal map having a second level of detail of wrinkles higher than the first level of detail of wrinkles; and
render, using the second normal map, an image of a three dimensional model including the simulated garment having the second level of detail of wrinkles.

14. The system of claim 13, wherein the one or more processors are further configured to:
receive, via the physics based cloth simulator, a garment template of a garment; and
deform, via the physics based cloth simulator, the garment template according to simulated force applied to the garment template, to generate the first normal map.

15. The system of claim 14, wherein the one or more processors are further configured to:
divide the deformed garment template into a plurality of segments to generate the first normal map.

16. The system of claim 15, wherein the one or more processors are further configured to:
apply each corresponding segment of the plurality of segments as an input to the machine learning model to generate a corresponding plurality of output segments having a level of detail of wrinkles higher than that of the corresponding segment.

17. The system of claim 16, wherein the one or more processors are further configured to combine the corresponding plurality of output segments to render the image of the simulated garment.

18. The system of claim 13, wherein the machine learning model is trained by providing i) a third normal map of the simulated garment having the first level of detail of wrinkles generated by the physics based cloth simulator and ii) a fourth normal map of the simulated garment having the second level of detail of wrinkles generated by the physics based cloth simulator, as inputs to the machine learning model.

19. The system of claim 18, wherein the machine learning model is trained by:
receiving, by the physics based cloth simulator, a first garment template of a garment having a first resolution, and a second garment template of the garment having a second resolution higher than the first resolution;
deforming, by the physics based cloth simulator, the first garment template according to simulated force applied to the first garment template to generate the third normal map; and
deforming, by the physics based cloth simulator, the second garment template according to the simulated force applied to the second garment template to generate the fourth normal map.

20. The system of claim 19, wherein the machine learning model is trained by:

receiving, by the one or more processors, scanned data of the garment having a resolution equal to or higher than the second resolution; and generating, by the one or more processors, the fourth normal map by applying the scanned data of the garment to the second garment template.

\* \* \* \* \*